US012617217B2

(12) United States Patent
Maezawa

(10) Patent No.: US 12,617,217 B2
(45) Date of Patent: May 5, 2026

(54) INKJET RECORDING APPARATUS INCLUDING PRECOATING LIQUID HEAD UNIT EJECTING PRECOATING LIQUID TO PRINTING BASE MATERIAL

(71) Applicant: KYOCERA Document Solutions Inc., Osaka (JP)

(72) Inventor: Nobuhiro Maezawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 136 days.

(21) Appl. No.: 18/662,977

(22) Filed: May 13, 2024

(65) Prior Publication Data

US 2024/0383264 A1 Nov. 21, 2024

(30) Foreign Application Priority Data

May 18, 2023 (JP) ................................ 2023-082021

(51) Int. Cl.

*B41J 11/00* (2006.01)
*B41J 3/407* (2006.01)
*B41J 13/08* (2006.01)

(52) U.S. Cl.

CPC ......... *B41J 11/00216* (2021.01); *B41J 3/407* (2013.01); *B41J 13/08* (2013.01)

(58) Field of Classification Search

CPC ...... B41J 11/00216; B41J 3/407; B41J 13/08; B41J 11/0015; B41J 11/0024; B41J 2/01; B41J 29/38

See application file for complete search history.

(56) References Cited

U.S. PATENT DOCUMENTS 6,012,809 A * 1/2000 Ikeda ................. B41J 11/00244 347/15
2009/0244146 A1* 10/2009 Chiwata ............... B41J 11/0022 347/14

FOREIGN PATENT DOCUMENTS

JP H09254376 A 9/1997
JP 2009226886 A 10/2009

* cited by examiner

*Primary Examiner* — Bradley W Thies
(74) *Attorney, Agent, or Firm* — Studebaker Brackett PLLC

(57) ABSTRACT

An inkjet recording apparatus includes an ink head unit, a precoating head unit, a conveying plate, and a heating part. The ink head unit ejects ink to a printing base material conveyed along a predetermined conveying direction. The precoating liquid head unit is disposed on an upstream side of the ink head unit in the conveying direction and ejects precoating liquid to the printing base material. The conveying plate is disposed below the ink head unit and the precoating liquid head unit and on which the printing base material is conveyed. The heating part heats the conveying plate. When a temperature of the conveying plate below the precoating liquid head unit is set to T1, and a temperature of the conveying plate below the ink head unit is set to T2, the heating part heats the conveying plate such that T1 is less than T2.

5 Claims, 3 Drawing Sheets

FIG. 3

| | T1 | T2 | NOZZLE CLOGGING | COLOR MIXING |
|---|---|---|---|---|
| PRESENT EXAMPLE 1 | 40 | 50 | ○ | ○ |
| PRESENT EXAMPLE 2 | 30 | 50 | ○ | ○ |
| PRESENT EXAMPLE 3 | 40 | 60 | ○ | ○ |
| COMPARATIVE EXAMPLE 1 | 50 | 50 | △ | ○ |
| COMPARATIVE EXAMPLE 2 | 60 | 50 | × | ○ |
| COMPARATIVE EXAMPLE 3 | 40 | 40 | ○ | △ |
| COMPARATIVE EXAMPLE 4 | 40 | 30 | ○ | × |

INKJET RECORDING APPARATUS INCLUDING PRECOATING LIQUID HEAD UNIT EJECTING PRECOATING LIQUID TO PRINTING BASE MATERIAL

INCORPORATION BY REFERENCE

This application is based on and claims the benefit of priority from Japanese patent application No. 2023-082021 filed on May 18, 2023, which is incorporated by reference in its entirety.

BACKGROUND

The present disclosure relates to an image forming apparatus which forms an image on a printing base material by an inkjet method.

In an inkjet type image forming apparatus, when ink is ejected on a printing base material having a smooth surface such as a plastic film, the ink may move from a position where it landed and blot or may be mixed with other colored ink. In order to prevent such blotting and color mixing, a precoating treatment is generally performed in which a precoating liquid for suppressing ink spreading is ejected onto the printing base material before image formation.

However, when the precoating liquid is ejected onto the printing base material, the temperature of the printing base material decreases, the reactivity between the ink ejected next and the precoating liquid decreases, and the blotting and color mixing are easily to occur.

Accordingly, the inkjet printing apparatus may be provided with a platen for supporting the back surface of the printing sheet and an infrared lamp for heating the printing sheet through the platen. By heating the sheet conveyed on the platen, moisture in the ink is quickly evaporated, and drying of the ink is accelerated. Alternatively, the image forming apparatus may be provided with a treatment liquid supply means for supplying a treatment liquid and a treatment liquid drying means for heating and drying the treatment liquid film formed on a base material. The solvent in the treatment liquid is removed by the treatment liquid drying means, and adhesion between the color material of the ink and the base material is improved.

When the sheet is heated or the treatment liquid film is dried as described above, if the evaporation of moisture in the ink proceeds too much, a defect such as clogging of the nozzle of the print head may occur. As described above, while it is preferable to increase the temperature of the printing base material in order to promote the drying of the ink, it is preferable that the temperature of the print head itself adjacent to the printing base material be as low as possible. In the above methods, it is difficult to control the temperature so as to make both of them compatible.

SUMMARY

An inkjet recording apparatus according to the present disclosure includes an ink head unit, a precoating head unit, a conveying plate, and a heating part. The ink head unit ejects ink to a printing base material conveyed along a predetermined conveying direction. The precoating liquid head unit is disposed on an upstream side of the ink head unit in the conveying direction and ejects precoating liquid to the printing base material. The conveying plate is disposed below the ink head unit and the precoating liquid head unit and on which the printing base material is conveyed. The heating part heats the conveying plate. When a temperature of a surface of the conveying plate below the precoating liquid head unit is set to T1, and a temperature of a surface of the conveying plate below the ink head unit is set to T2, the heating part heats the conveying plate such that T1 is lower than T2 (T1<T2).

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DRAWINGS

FIG. 3 is a table showing an evaluation result of clogging of the nozzle and blotting.

DETAILED DESCRIPTION

Hereinafter, an image forming apparatus according to one embodiment of the present disclosure will be described with reference to the drawings.

Figure 1:
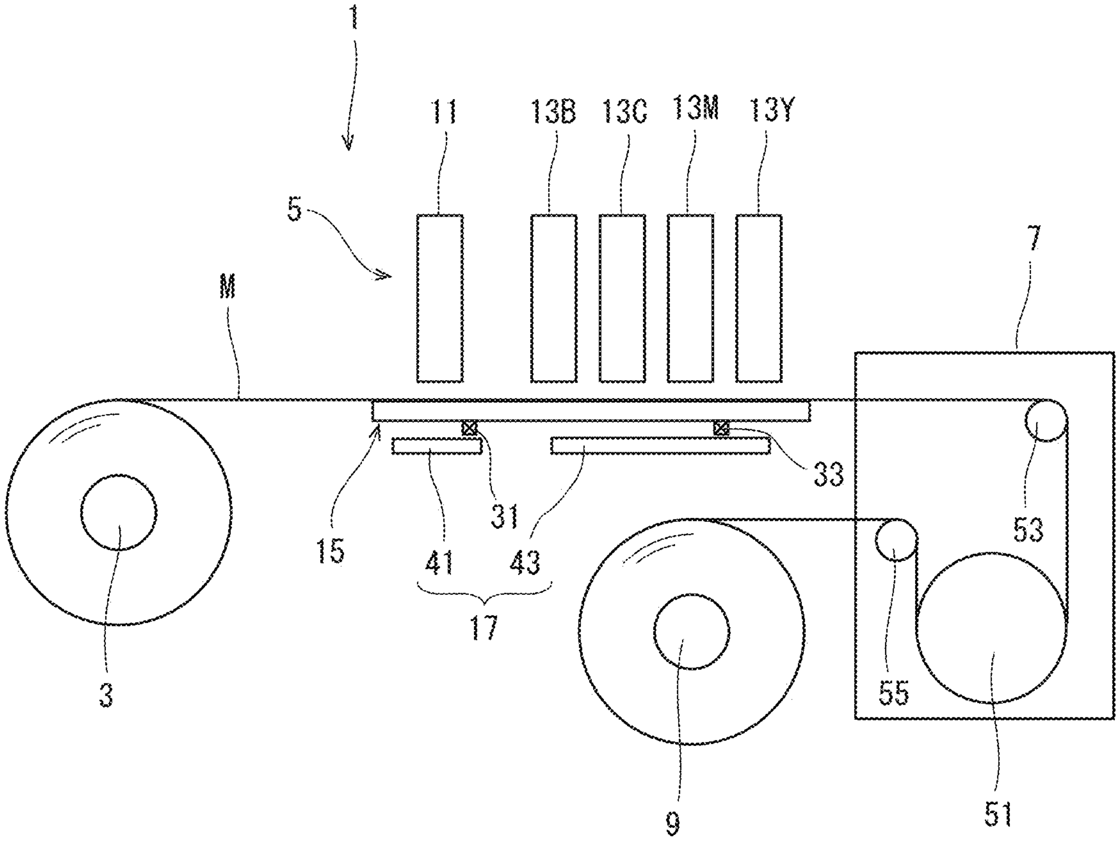
FIG. 1 is a front view schematically showing an image forming apparatus according to one embodiment of the present disclosure.

With reference to FIG. 1, the entire structure of the image forming apparatus 1 will be described. FIG. 1 is a front view schematically showing an internal structure of the image forming apparatus 1.

The image forming apparatus 1 includes a feed roller 3 around which a long printing base material M is wound, an image forming part 5 which forms an image on the printing base material M fed from the feed roller 3, in an inkjet method, a drying part 7 which dries the image formed by the image forming part 5, and a rewinding roller 9 which winds the printing base material M dried by the drying part 7.

The printing base material M is wound and mounted on the feed roller 3. By rotating the feed roller 3, the printing base material M is fed out in a predetermined conveying direction.

The image forming part 5 is disposed on the downstream side of the feed roller 3 in the conveying direction. The image forming part 5 includes one precoating liquid head unit 11, four ink head units 13B, 13C, 13M, and 13Y (collectively referred to as the ink head unit 13), a conveying plate 15 on which the printing base material M is conveyed, and a heating part 17 which heats the conveying plate 15.

The precoating liquid head unit 11 is disposed on the upstream side of the ink head units 13 in the conveying direction. The precoating liquid head unit 11 and the ink head units 13 have the same structure.

Figure 2:
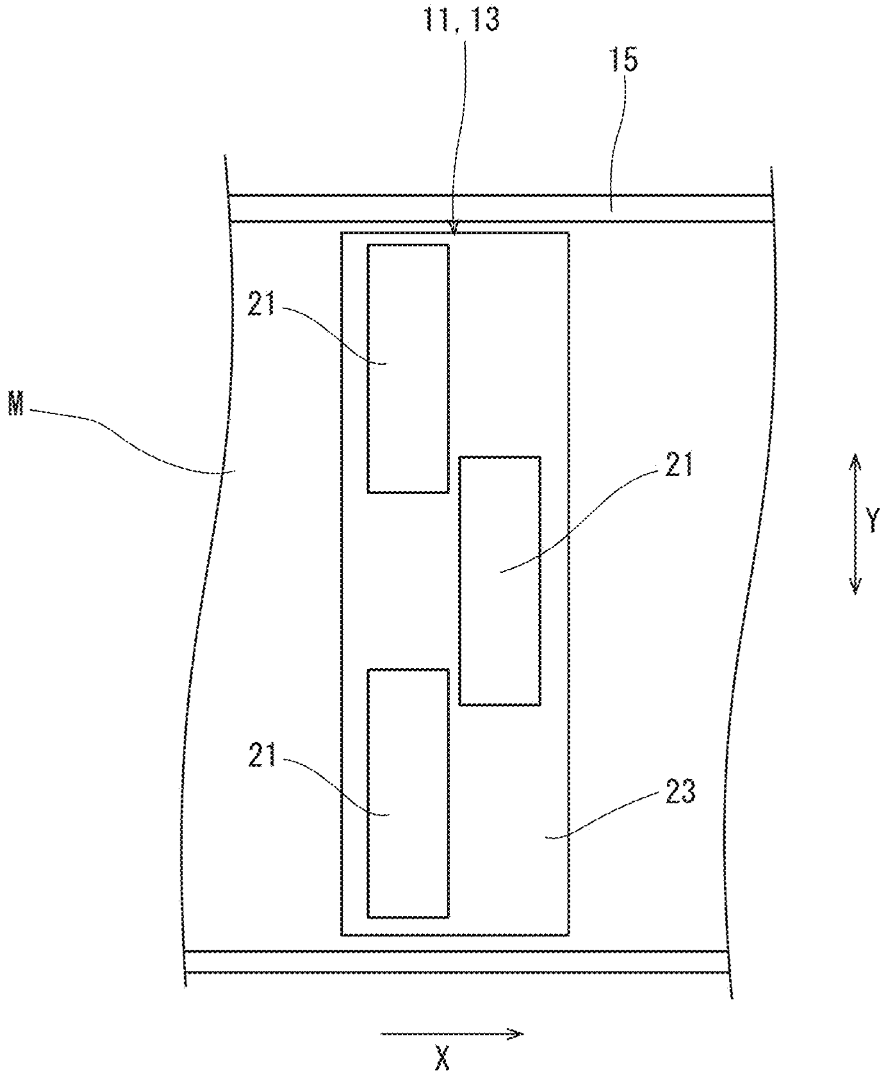
FIG. 2 is a plan view showing a print head, in the image forming apparatus according to the embodiment of the present disclosure.

As shown in FIG. 2, the precoating liquid head unit 11 and the ink head units 13 each include three print heads 21 and a plate 23 for supporting the three print heads 21. FIG. 2 is a plan view showing the head unit.

As shown in FIG. 2, the three print heads 21 are arranged in a staggered shape along the width direction Y (a direction intersecting the conveying direction X) so as to have the same width as the width of the printing base material M (a length along the width direction Y) (a line head system), and are supported by the plate 23. Each print head 21 includes a number of nozzles (not shown). The ejection ports of the nozzles are opened to the lower surface of the print head 21.

The precoating liquid is supplied to each print head 21 of the precoating liquid head unit 11. The supplied precoating liquid is ejected downward from the ejection port of each print head 21. The components of the precoating liquid are, for example, 10% polyester resin (Trade name, PESRESIN A-640, manufactured by TAKAMATSU OIL&HAT CO., LTD.), 0.04% surfactant (Trade name, Surfynol 440, manufactured by Nisshin Chemical co., ltd.), 25% propylene glycol, and 64.96% water.

The four ink head units 13B, 13C, 13M, and 13Y are arranged in order along the conveying direction X, and black, cyan, magenta, and yellow inks are supplied, respectively. The supplied ink is ejected downward from the ejection ports of each print head 21.

With reference to FIG. 1 again, the conveying plate 15 is disposed below the precoating liquid head unit 11 and the ink head units 13. The upper surface of the conveying plate 15 is formed flat. As shown in FIG. 2, the width of the conveying plate 15 is wider than the width of the printing base material M and all the head units 11 and 13. The conveying plate 15 is made of, for example, metal.

The conveying plate 15 is provided with a precoating liquid temperature sensor 31 and an ink temperature sensor 33 below the precoating liquid head unit 11 and below the ink head units 13, respectively. Both temperature sensors 31 and 33 are electrically connected to a control part (not shown).

The printing base material M fed from the feed roller 3 is conveyed below the precoating liquid head unit 11 and the ink head units 13 along the upper surface of the conveying plate 15.

The heating part 17 is disposed below the conveying plate 15, and includes a precoating liquid heating part 41 and an ink heating part 43. The precoating liquid heating part 41 is disposed below the precoating liquid head unit 11. The ink heating part 43 is disposed below the ink head units 13. Both heating parts 41, 43 are, for example, electric heating wires. The precoating liquid heating part 41 and the ink heating part 43 are electrically connected to the control part, and independently turned on and off by the control part.

The drying part 7 is disposed on the downstream side of the image forming part 5 in the conveying direction. The drying part 7 includes a heat drum 51 and upstream and downstream tension rollers 53, 55 disposed on the upstream side and the downstream side of the heat drum 51. The printing base material M passed through the image forming part 5 is wound around the heat drum 51 between the upstream and downstream tension rollers 53, 55. The heat drum 51 is heated to dry the printing base material M conveyed along its surface.

The rewinding roller 9 is disposed on the downstream side of the drying part 7 in the conveying direction. One end of the printing base material M is fixed to the rewinding roller 9. The rewinding roller 9 is connected to a motor (not shown) and rotated. By rotating the rewinding roller 9 in a predetermined direction at a predetermined rotational speed by the motor, the printing base material M is fed from the feed roller 3. The fed printing base material M passes through the image forming part 5 and the drying part 7, and is wound by the rewinding roller 9.

The image forming operation of the image forming apparatus 1 having the above configuration will be described. In the image forming operation, the control part drives the precoating liquid heating part 41 and the ink heating part 43, and heats the conveying plate 15. The temperature of the conveying plate 15 is measured by two temperature sensors 31, 33. The measured values of the two temperature sensors 31, 33 are transmitted to the control part. The control part drives the precoating liquid heating part 41 and the ink heating part 43 such that the temperature T1 of the conveying plate 15 below the precoating liquid head unit 11 and the temperature T2 of the conveying plate 15 below the ink head units 13 are equal to the predetermined temperatures. The temperature T1 is a temperature at which the precoating liquid ejected from the precoating liquid head unit 11 is half-dried, and, for example, is 35 to 40 degrees Celsius. The temperature T2 is a temperature higher than the temperature T1 and at which drying of the ink is promoted, and, for example, is 60 degrees Celsius.

Thereafter, the motor is driven to rotate the rewinding roller 9, and the printing base material M is fed from the feed roller 3 to the image forming part 5. In the image forming part 5, the printing base material M is conveyed along the upper surface of the conveying plate 15. First, the precoating liquid is ejected from the precoating liquid head unit 11 on the printing base material M, based on image data. At this time, since the conveying plate 15 is heated as described above, the printing base material M conveyed along the upper surface of the conveying plate 15 is also heated. As a result, the temperature decreasing of the printing base material M due to the precoating liquid is suppressed, and the ejected precoating liquid is half-dried.

Thereafter, the printing base material M is conveyed below the ink head units 13, and the ink of a predetermined color is ejected from the corresponding ink head unit 13 based on the image data. The ink reacts with the precoating liquid, making it difficult to move from the landing position. Also at this time, since the conveying plate 15 is heated as described above, the reaction between the ink and the precoating liquid is promoted, and the evaporation of moisture contained in the ink is promoted. However, the ink does not dry completely.

The printing base material M on which the image is formed in the above way is conveyed to the drying part 7. The ink is completely dried in the drying part 7. Thereafter, the printing base material M is wound around the rewinding roller 9.

As described above, according to the present disclosure, the conveying plate 15 below the precoating liquid head unit 11 is heated to the temperature T1 so that the temperature decreasing of the printing base material M due to the precoating liquid is suppressed. Further, the conveying plate 15 below the ink head units 13 is heated to the temperature T2 higher than the temperature T1, so that the reactivity between the precoating liquid and the ink is enhanced, the ink is difficult to move from the landing position, and the blotting and color mixing can be suppressed. Further, the drying of the ink can be accelerated.

Further, since the temperature T1 is a temperature at which the precoating liquid ejected from the precoating liquid head unit 11 does not dry, the reactivity between the precoating liquid and the ink can be enhanced while the temperature decreasing of the printing base material M is suppressed. Further, since the temperature T2 is 60 degrees Celsius or less, the temperature increasing of the nozzle of the ink head unit 13 adjacent to the printing base material M and the conveying plate 15 can be suppressed, and the clogging caused by drying of the ink in the nozzle can be suppressed. It should be noted that the temperature T2 is preferably low in order to suppress the clogging of the nozzle, and is particularly preferable to be 50 degrees Celsius or less.

Next, an experiment in which the clogging of the nozzle and the color mixing are evaluated in the image forming apparatus 1 of the present embodiment will be described. As the precoating liquid, the one containing the above components (10% Polyester resin (Trade name, PESRESIN A-640, manufactured by TSKAMATSU OIL&FAT CO., LTD.), 0.04% surfactant (Trade name, Surfynol 440, manufactured by Nisshin Chemical co., ltd.), 25% propylene glycol, 64.96% water) is used.

The temperatures T1, T2 are set as shown in the table shown in FIG. 3. In the present examples, the temperature T1 is set to 40 degrees Celsius or 30 degrees Celsius, and the temperature T2 is set to 50 degrees Celsius or 60 degrees Celsius higher than the temperature T1. On the other hand, in the comparative examples, the temperature T1 is set to 40, 50, or 60 degrees Celsius, and the temperature T2 is set to be lower than 60 degrees Celsius and equal to the temperature T1 or lower than the temperature T1. The nozzle clogging and color mixing are evaluated by the following method.

As for the nozzle clogging, the temperature T1 and the temperature T2 are set as shown in the table, and after being left for 8 hours, a predetermined nozzle check pattern is printed to confirm the presence or absence of the non-ejection nozzle. The case where there are zero non-ejection nozzles is defined as o, the case where there are no more than three non-ejection nozzles is defined as Δ, and the case where there are four or more non-ejection nozzles is defined as X.

As for the color mixing, adjacent belt-shaped cyan and magenta images are printed on PET film (Trade name, Rumiller #50-S10, manufactured by Toray Industries, Inc.) at 600 dpi and observed at a magnification of 50 using a digital microscope (Trade name, KH-8700, manufactured by Hirox). The case where the width of the color mixing area is less than 5 μm is defined as o, the case where the width of the color mixing area is less than 15 μm is defined as Δ, and the case where the width of the color mixing area is 15 μm or more is defined as x.

As shown in the table of FIG. 3, in the present examples 1 to 3 where the temperature T2 is higher than the temperature T1 and the temperature T2 is 60 degrees Celsius or less, no nozzle clogging and no blotting are observed.

On the other hand, in the comparative examples 1 and 2 where the temperature T2 is relatively high such as 50 degrees Celsius, no color mixing is observed. This is probably because the drying of the ink progressed. In the comparative examples 3, 4 where the temperature T2 is relatively low, the color mixing occurs. This is because drying of the ink has not progressed due to the low temperature.

In the comparative Examples 1, 2 where the temperature T1 is the same as or higher than the temperature T2, the nozzle clogging occurs. In this case, since the temperature T1 is relatively high such as 50 or 60 degrees Celsius, the conveying plate 15 has high temperature, and the nozzle adjacent to the conveying plate 15 also has high temperature, therefore, the drying of the ink progresses and the nozzle clogging occurs. In the comparative examples 3, 4 where the temperature T1 is the same as or higher than the temperature T2, no nozzle clogging occurs. This is probably because the heating of the nozzle is suppressed because of the relatively low temperature T1.

In order to accelerate the drying of the ink, the temperature T1 and the temperature T2 are preferably high, but if both are high, the nozzle clogging occurs. Therefore, by increasing the temperature T2 at which the drying of the ink and the reactivity with the precoating liquid need to be enhanced while lowering the temperature T1 than the temperature T2, the ink can be dried to such an extent that no nozzle clogging occurs. Therefore, it has been confirmed that by setting the temperature T2 to 60 degrees Celsius or less, preferably 50 degrees Celsius or less, and setting the temperature T1 lower than the temperature T2, the reactivity between the precoating liquid and the ink can be enhanced while suppressing the temperature increasing of the print head (nozzle).

In particular, the print head is preferably maintained at a constant temperature as much as possible because the surface tension of the ink ejected from the nozzle varies depending on the temperature. Therefore, the heating parts 41, 43 are controlled so as to maintain the temperature T1 and the temperature T2.

In the above embodiment, the four ink head units 13 are used, but the present disclosure is not limited to the four colors, and may be more or less than the four colors. The head units 11, 13 are not limited to the line head system. However, the line head system is preferable because the printing speed can be increased. Although the electric heating wire is used as the heating part 17, any other system such as a halogen heater, a ceramic heater, a high-frequency induction heating (IH), or hot water may be applied. The conveying plate 15 below the precoating liquid head unit 11 and the conveying plate 15 below the ink head units 13 may be separately provided. A long plastic film (PET film) is used as the printing base material M, but a cut film may be used. The printing base material M may be a synthetic paper or the like.

Although the present disclosure has been described in particular embodiments, the present disclosure is not limited to the foregoing embodiments. A person skilled in the art may modify the above embodiments so long as they do not deviate from the scope and object of the present disclosure.

The invention claimed is:

1. An inkjet recording apparatus comprising:

an ink head unit which ejects ink to a printing base material conveyed along a predetermined conveying direction;

a precoating liquid head unit which is disposed on an upstream side of the ink head unit in the conveying direction and ejects precoating liquid to the printing base material;

a conveying plate which is disposed below the ink head unit and the precoating liquid head unit and on which the printing base material is conveyed; and a heating part which heats the conveying plate, wherein when a temperature of a surface of the conveying plate below the precoating liquid head unit is set to T1, and a temperature of a surface of the conveying plate below the ink head unit is set to T2, T1 is a temperature at which the precoating liquid ejected from the precoating liquid head unit is not completely dried, T2 is a temperature at which drying of the ink is promoted, and, the heating part heats the conveying plate such that T1 is lower than T2 ($T1<T2$).

2. The inkjet recording apparatus according to claim 1, wherein the temperature T2 of the conveying plate is 60 degrees Celsius or less.

3. The inkjet recording apparatus according to claim 1, wherein the printing base material is a plastic film.

4. The inkjet recording apparatus according to claim 1, wherein the precoating liquid head unit and the ink head unit have a same configuration.

5. The inkjet recording apparatus according to claim 1, wherein the conveying plate is one, and the heating part includes a precoating heating part disposed below the precoating liquid head unit and an ink heating part disposed below the ink head unit.

* * * * *